US012675886B1

(12) United States Patent
Piety et al.

(10) Patent No.: US 12,675,886 B1
(45) Date of Patent: Jul. 7, 2026

(54) MEASURING DYNAMIC MOTION IN THREE AXES USING MULTIPLE CAMERAS

(71) Applicant: RDI TECHNOLOGIES, INC., Knoxville, TN (US)

(72) Inventors: Kenneth Ralph Piety, Knoxville, TN (US); Jeffrey R. Hay, Prospect, KY (US); Mark William Slemp, Tellico Plains, TN (US); Douglas A. Mann, Farragut, TN (US)

(73) Assignee: RDI TECHNOLOGIES, INC., Knoxville, TN (US)

( * ) Notice: Subject to any disclaimer, the term of this patent is extended or adjusted under 35 U.S.C. 154(b) by 290 days.

(21) Appl. No.: 18/504,371

(22) Filed: Nov. 8, 2023

Related U.S. Application Data

(60) Provisional application No. 63/423,937, filed on Nov. 9, 2022.

(51) Int. Cl.
| | |
|---|---|
| *G06T 7/20* | (2017.01) |
| *G06T 7/80* | (2017.01) |
| *G06V 10/141* | (2022.01) |
| *G06V 10/25* | (2022.01) |
| *G06V 10/44* | (2022.01) |
| *H04N 7/01* | (2006.01) |

(52) U.S. Cl.
CPC .................. *G06T 7/20* (2013.01); *G06T 7/80* (2017.01); *G06V 10/141* (2022.01); *G06V 10/25* (2022.01); *G06V 10/44* (2022.01); *H04N 7/013* (2013.01)

(58) Field of Classification Search
CPC .. H04N 23/6811; H04N 23/681; H04N 7/013; G06T 7/20; G06T 7/80; G06V 10/141; G06V 10/25; G06V 10/44
See application file for complete search history.

(56) References Cited

U.S. PATENT DOCUMENTS

| | | | | | |
|---|---|---|---|---|---|
| 6,130,709 | A | * | 10/2000 | Sekine | H04N 23/6811 |
| | | | | | 348/169 |
| 8,670,039 | B2 | * | 3/2014 | Luneau | G01M 7/022 |
| | | | | | 348/208.4 |
| 9,172,876 | B2 | * | 10/2015 | Kusaka | H04N 23/6811 |
| 11,557,043 | B1 | * | 1/2023 | Hay | G06T 7/0004 |
| 2016/0144404 | A1 | | 5/2016 | Houston et al. | |

(Continued)

FOREIGN PATENT DOCUMENTS

WO        WO-9916113 A1 *  4/1999  .............. H10P 72/53

*Primary Examiner* — Shefali D Goradia
(74) *Attorney, Agent, or Firm* — Bricker Graydon Wyatt LLP; Stephen C. Hall

(57) ABSTRACT
Systems and methods are provided to perform measurements of vibratory motion in three axes using two or more cameras. The cameras are mounted in a fixed spatial relationship to each other and are calibrated such that internal camera distortion and external camera coordinate transformations are determined. Data from each pair of cameras can be processed independently to determine the z-axis motion from changes in the x-axis and y-axis motion measured by the cameras. Measurement noise can impact the small differences in values from camera pairs and multiple techniques have been identified to reduce noise and make reliable measurements of the z-axis vibratory motion. If more than two cameras are utilized, then the data from each pair can be averaged to improve the measured values.

8 Claims, 15 Drawing Sheets

(56) References Cited

U.S. PATENT DOCUMENTS

| 2016/0171309 | A1 | | 6/2016 | Hay | |
|---|---|---|---|---|---|
| 2016/0217587 | A1 | | 7/2016 | Hay | |
| 2016/0217588 | A1 | | 7/2016 | Hay | |
| 2016/0300341 | A1 | | 10/2016 | Hay et al. | |
| 2023/0388619 | A1 | * | 11/2023 | Yokobori | H04N 23/55 |

* cited by examiner

71

72

MEASURING DYNAMIC MOTION IN THREE AXES USING MULTIPLE CAMERAS

CROSS REFERENCE TO RELATED APPLICATIONS

This application claims the benefit of priority to U.S. Provisional Application No. 63/423,937, which was filed Nov. 9, 2022, the contents of which are incorporated herein by reference.

BACKGROUND

The measurement of dynamic motion including vibratory motion from civil structures, machines, and living beings using video recordings from cameras has gained wide acceptance since 2010. Vibratory motion is motion of an object associated with back and forth movement about a central point, and dynamic motion is transitory motion of an object from one position to another. While the descriptions contained herein can be applied to measure both vibratory motion and dynamic motion, for brevity the term "vibratory motion" is used herein in the descriptions of systems and methods for measuring motion along three spatial axes of an object undergoing movement.

A camera, i.e., video acquisition device, offers the advantages of being a non-contact sensor and provides information from millions of pixels simultaneously with broad spatial coverage. This use of cameras to measure motion has proven to be highly effective in troubleshooting problems plant equipment and civil structures. The light intensity measured at each pixel is a result of the light reflected from the objects in a field of view in the visible light range or radiation emitted from the objects due to temperature in the infrared portion of the electromagnetic spectrum. In the visible light range, changes of the light intensity can be related to the motion of objects in the field of view. In some cases, a fundamental unit of measurement is displacement, and the available measurement accuracy achieved using video recordings is a tenth of a mil or better. The accuracy achieved in field measurements is directly impacted by the distance to the objects in the field of view and the focal length of the lens used in the measurement. The application of mathematical techniques to filter and magnify the motion, and the ability to modify the frame rate on replay of the recorded video, allows technicians to visually present the motion of concern. Such visual presentation can provide powerful arguments about what is happening and the need for repair to decision-makers, who may have limited technical understanding of the underlying physics of the fault condition.

When optical measurements are done with a single camera, it provides information along two axes in the focal plane that is perpendicular to the lens axis or parallel to the focal array element on the camera. But in other contexts, information related to depth along the optical axis of the lens has been measured using two or more cameras, a stereo camera with multiple optical elements, or using photogrammetry to extract depth information from multiple frames collected from different perspectives. The purpose of all of the depth measurements described above is the collection of 3D information related to a scene that is nominally static. This is useful in creating 3D models or mapping geographical regions. However, none of these approaches are suitable for making high resolution measurements of small vibration motions along the optical axis.

Prior to the use of video measurements of motion, the common practice was to use sensors such as accelerometers or proximity probes to measure the motion at each point of interest. Triaxial accelerometers will measure motion in all three axes, horizontal, vertical, and axial directions, at the location where they are mounted. Proximity probes provide data in only one axis and would require 3 probes to be mounted at each location where motion in all axes is desired. By comparison, dynamic measurements using a single video camera often produce data from millions of pixels in the two axes perpendicular to the optical axis of the lens. Video vibration measurement systems, such as the IRIS MR MOTION AMPLIFICATION® System (RDI Technologies Inc., Knoxville, Tennessee), allow the user to identify a spatial region of interest (hereafter, "ROI"), anywhere in the field of view using a graphical user interface, and track the motion of a distinctive feature in the ROI. In the IRIS MR system referenced herein, the system software calculates the dominant motion along an X-axis (sometimes referred to herein as a first axis) and a Y-axis (sometimes referred to herein as a second axis) in the ROI and presents time waveform graphs with a cursor synchronized to the frames of the video as well as frequency spectra of the motion. Even so, there is a need for a convenient method to collect and measure dynamic motion in all three spatial axes using video cameras. The present invention describes optical methods that enable the measurement of the vibration motion in all three axes using two or more cameras that are positioned and calibrated in a fixed spatial relationship.

SUMMARY

The embodiments herein are directed to systems and methods for measuring the dynamic motion of objects in a field of view (FoV) in 3 axes using two or more cameras. These two cameras must be mounted and calibrated in a fixed spatial relationship to each other and collect their frames simultaneously. The user can identify a region of interest in a selected frame of the reference camera, and the software will identify and track the motion of one or more distinct features in the corresponding ROIs in both sets of frames. The difference between measurements in the two cameras is the basis for calculating the dynamic motion in the third dimension along the lens axis. The extension of the method to additional cameras would allow additional measurements that could improve the accuracy of the measurements.

Present embodiments, therefore, include systems and methods that employ video recordings comprising a plurality of video images of an object undergoing vibratory motion or other dynamic motion, with the video images being divisible into individual video image frames, and each individual video image frame is divisible into a plurality of pixels. In some embodiments, a processor is operably connected to the two or more cameras, again being in a fixed spatial relationship to each other, and whose lenses are calibrated. In this way, the video acquisition devices determine a depth associated with a series of position measurements in a direction parallel to the optical axis of the reference camera to a point on the object undergoing motion. Changes in position of the object along a series of points representing the object's position at a specific time facilitates a measurement of motion in accordance with the present embodiments. A computer program (i.e., software) operating in the processor provides instructions in order to adjust a frame rate of the cameras to provide a sampling rate for capturing a plurality of frequencies present in the vibratory motion of the object, and for acquiring the individual frames on all the cameras simultaneously. Further, the instructions calculate a displacement of the object along two axes of the vibratory motion, and then each of these axes represents a focal plane of a camera pairing or grouping, and further the instructions determine the vibratory motion of the object in a third axis, which is parallel to the optical axis of the reference camera.

For added flexibility, vibratory motion of the object can be derived when the cameras are mechanically aligned, e.g., either horizontally-aligned or vertically-aligned. Additionally, an ROI containing a feature for evaluating the vibratory motion of the object can be selected by a user, or alternatively identified by the computer program. While not intended as limiting, the foregoing are among the aspects, benefits, and advantages of present embodiments provided for herein.

BRIEF DESCRIPTION OF FIGURES

The drawings, schematics, arrangements, figures, and descriptions contained in this application are to be understood as illustrative of steps, structures, features, and aspects of the present embodiments. Accordingly, the scope of embodiments is not limited to features, dimensions, scales, and arrangements shown in the figures.

MULTIPLE EMBODIMENTS AND ALTERNATIVES

Figure 1:
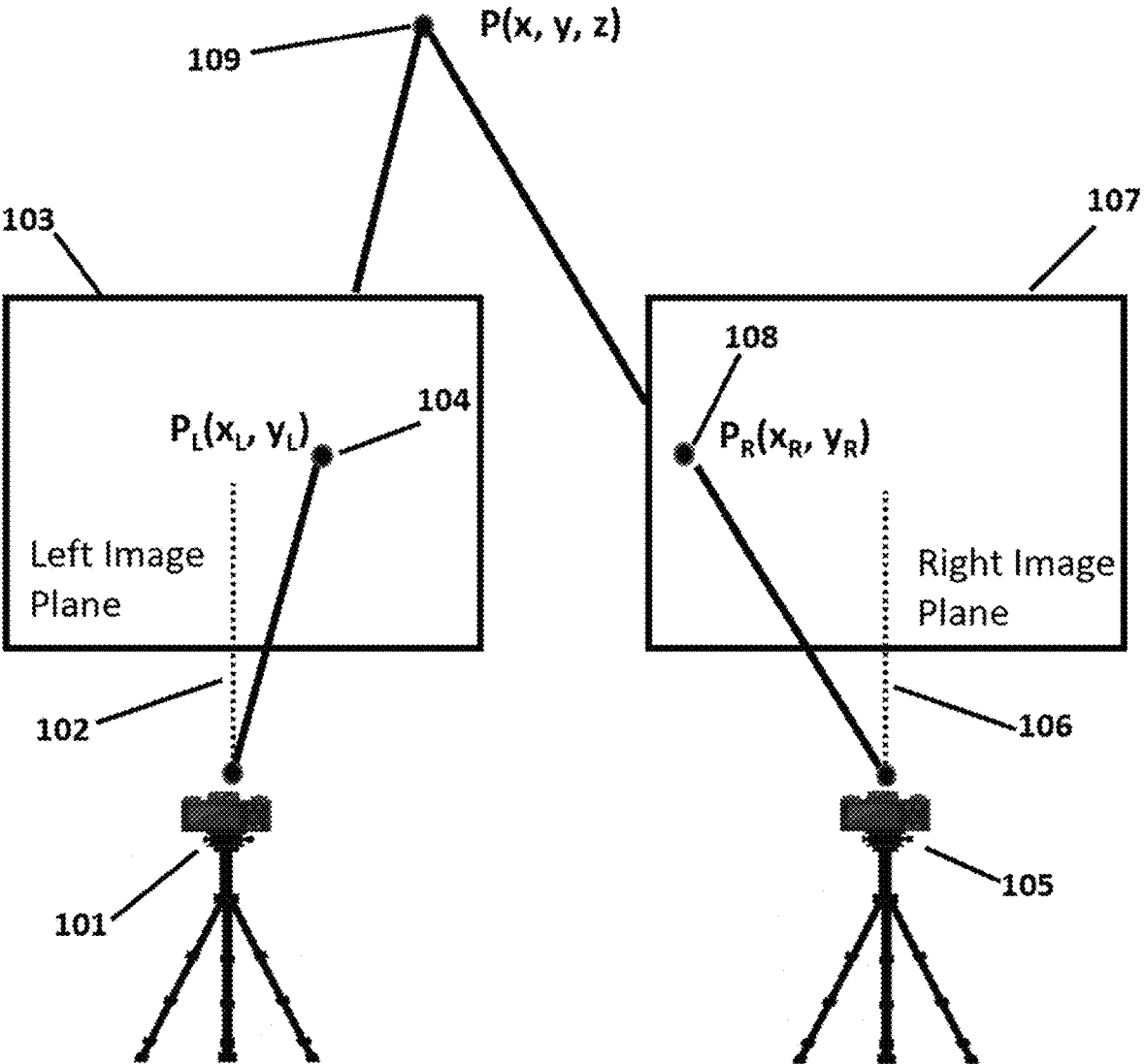
FIG. 1 is an illustration of using two cameras with parallel optical axes to make depth or z-axis position measurements.

In some embodiments within the scope of subject matter claimed herein, a system is provided for evaluating equipment or civil structures (i.e., an object or objects) undergoing vibratory motion along all three spatial axes. Sampled data is acquired simultaneously in the form of video recordings from a plurality of video acquisition devices, each video recording comprising a video recording of the object as it undergoes movement. In some arrangements, a first video acquisition device is a reference camera capable of obtaining video recordings, and otherwise suitable for arrangement with a point of view along an optical axis between the reference camera and the object. The reference camera will be operably connected to a processor, as disclosed and claimed herein, and a computer operates in the processor in various ways. In some embodiments, the computer program or the video acquisition devices themselves are configured to adjust a frame rate of the two or more video acquisition devices to provide for a sampling rate to capture a plurality of frequencies present in the vibratory motion and determine a depth or z-axis position measurements when the two or more video acquisition devices are configured and calibrated in a fixed spatial arrangement. Example embodiments could include cameras that are horizontally-aligned, vertically-aligned, or whose spatial relationship is established by environment constraints associated with the object under test. Generally, a depth measurement is determined in a direction parallel to the optical axis of the reference camera and is based upon a relationship between a 3-dimensional point in a world coordinate system and a 2-dimensional series of points from the optical plane of the cameras representing vibratory motion in one or more of the video image frames. In some embodiments, the computer program calculates a displacement of the object along two axes of the vibratory motion representing the 2-dimensional planar series of points, and determines the vibratory motion in a third axis, wherein the third axis is parallel to the optical axis of the reference camera. The motion along the coordinate axes in an arbitrary world coordinate system can be obtained using the rotation matrix and the translation vector estab- lished in the calibration process.

Generally, each video recording comprises a plurality of video images of the moving object which are divisible into individual video image frames, and with each frame being divisible into a plurality of pixels. Such a system may comprise two or more video acquisition devices, such as but not limited to video cameras, webcams, digital cameras integrated in cells phones, or a single video acquisition instrument with multiple charge coupled device (CCD) elements. During the measurement, the video acquisition devices are positioned with an unobstructed view of a selected portion of an object to collect frames simultane- ously resulting in multiple video recordings of the object in motion. Also, such a system or method may comprise or utilize a processor and a memory for storage of the indi- vidual video image frames as well as any that are modified through the processes described herein, and a computer program operating in the processor, in addition to the video acquisition devices.

Embodiments are not limited to a particular type of video acquisition device, but may include two or more video cameras, webcams, or digital cameras sensitive to other wavelengths in the electromagnetic spectrum. A video acquisition device in the embodiments herein may be con- figured with an adjustable frame rate that allows the video images to be acquired at a sampling rate that is sufficient to capture a plurality of frequencies present in the periodic motion. That is, video images are acquired by a video acquisition device at a rate expressed in frames per second (fps), wherein for example at 120 fps there would be 1200 frames acquired in 10 sec. A computer program in the embodiments herein comprises computer-readable program instructions executed by the processor and may be config- ured to operate on a subset of pixels from the plurality of pixels in a field of view of the video recording.

The process for measuring depth with two cameras is documented in the art and software routines are provided in an open-source computer vision library named OpenCV. To measure depth, the cameras must be mounted and calibrated in a fixed spatial relationship. In an exemplary embodiment, the two cameras, labelled 101 and 105, are mounted such that the optical axes of the cameras, labelled 102 and 106, are parallel as shown in FIG. 1. The left camera, and right camera are aligned vertically and if the camera-lens com- binations were free of any distortion, then the point labelled 109, P(x,y,z), in three-dimensional space would intersect the left image plane, 103 at the position $P_L(x_L, y_L)$ labeled 104 and the right image plane, 107, at the position $P_R(x_R, y_R)$ labeled 108. In this situation, the $y_L$ and $y_R$ are equal and the disparity between the values of $x_L$ and $x_R$ provides the information necessary to calculate the depth or motion (along the z-axis) of point P(x,y,z). Persons of ordinary skill in the art will readily discern that an alternate embodiment could use horizontally-aligned cameras, or equivalently rotate the vertically-aligned cameras by 90 degrees resulting in a horizontally-aligned configuration. In this situation, $x_L$ and $x_R$ would be equal, and the disparity between the values of $y_L$ and $y_R$ would provide the information necessary to calculate the depth or motion (along the z-axis) of point P(x,y,z). Only the case of vertically-aligned cameras (i.e., where positions deviate in a horizontal direction but not relative to a floor or other vertical supporting structure) will be discussed in the later description herein, but it shall be understood in these descriptions that the embodiment with horizontally-aligned cameras operates under equivalent principles. Although FIG. 1 illustrates the case of using two cameras, an alternate embodiment that used more than two cameras could be implemented to improve the accuracy of the position or motion of an object in the z-axis direction by considering all possible pairings of two cameras and aver- aging the individual results.

Figure 2:
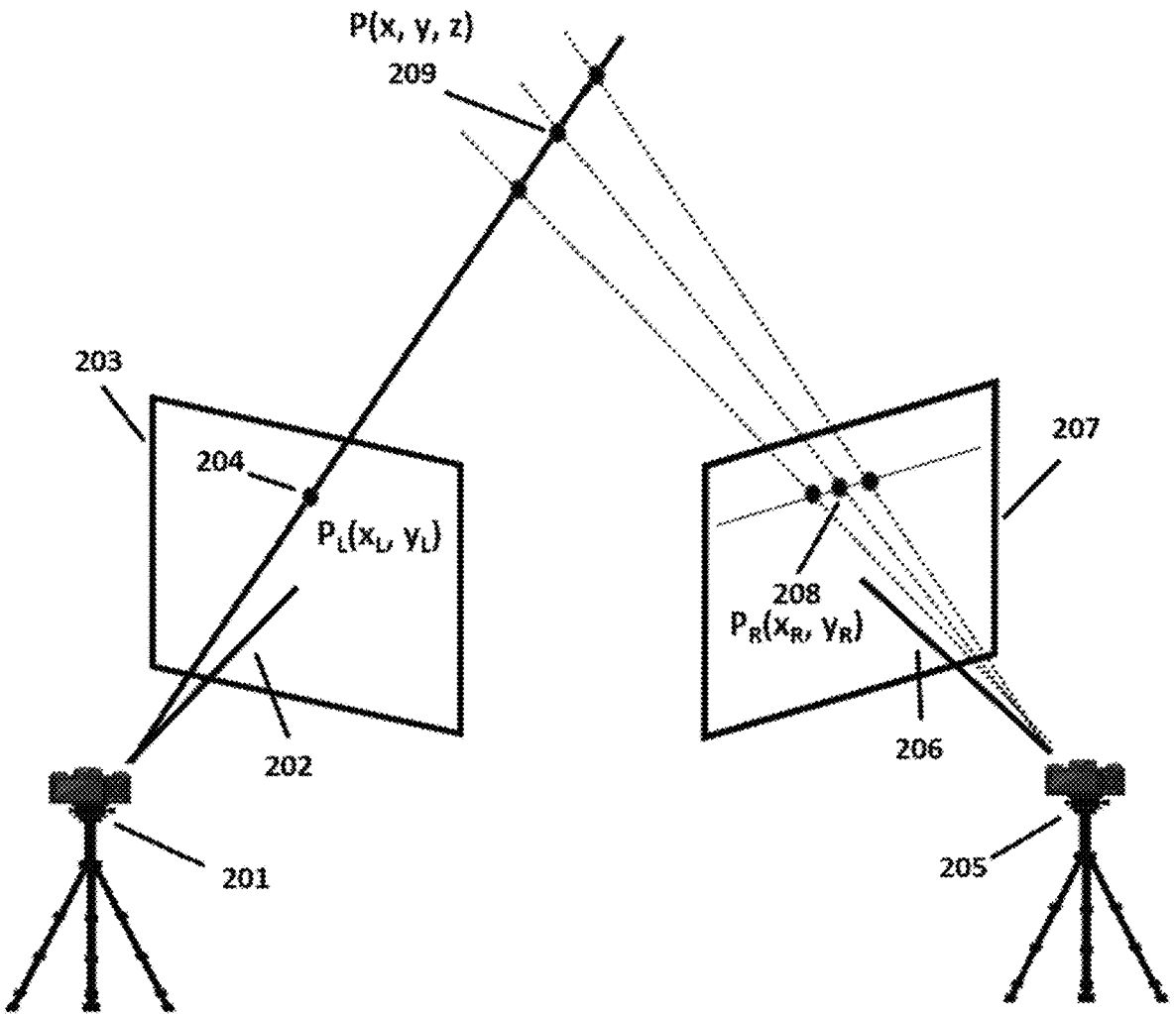
FIG. 2 is an illustration of using two camera that do not have parallel optical axes to make depth or z-axis position measurements.

An alternative embodiment of the use of two cameras to measure depth is illustrated in FIG. 2 where the cameras, labelled 201 and 205, do not have parallel optical axes, labelled 202 and 206. The left camera, and right camera are typically mechanically aligned; and if the camera-lens com- binations were free of any distortion, then the point labelled 209, P(x,y,z), in three-dimensional space would intersect the left image plane, 203 at the position $P_L(x_L, y_L)$ labeled 204 and the right image plane, 207, at the position $P_R(x_R, y_R)$ labeled 208. In this situation, the $y_L$ and $y_R$ are equal and the disparity between the values of $x_L$ and $x_R$ provides the information necessary to calculate the position or motion along the z-axis of point P(x,y,z). This case is well under- stood by those who practice the art and will result in different sets of equations, which map the measurements made in each focal plane into a depth value.

The embodiments shown in FIGS. 1 and 2 represent embodiments where the two cameras are mounted on a rigid structure with a fixed spatial relationship. In these embodi- ments, the calibration procedure can be performed in a lab prior to making measurements. This approach will suffice for certain applications where the paired cameras can be mounted sufficiently close to the objects in motion and still cover the desired field of view. This may not be possible in certain measurement applications, especially when applied to large civil structures, such as bridges, towers, wind turbines, etc., where the camera is mounted hundreds of meters from the structure, such that the cameras may need to be specifically placed in suitable locations. In these applications, the calibration of the cameras will need to be done in the field using a calibration panel or calibration targets mounted on the structure to be monitored. Addition- ally, the paired cameras would need to be connected by a cable or utilize a wireless communication scheme to enable the video frames to be collected simultaneously.

Figure 3:
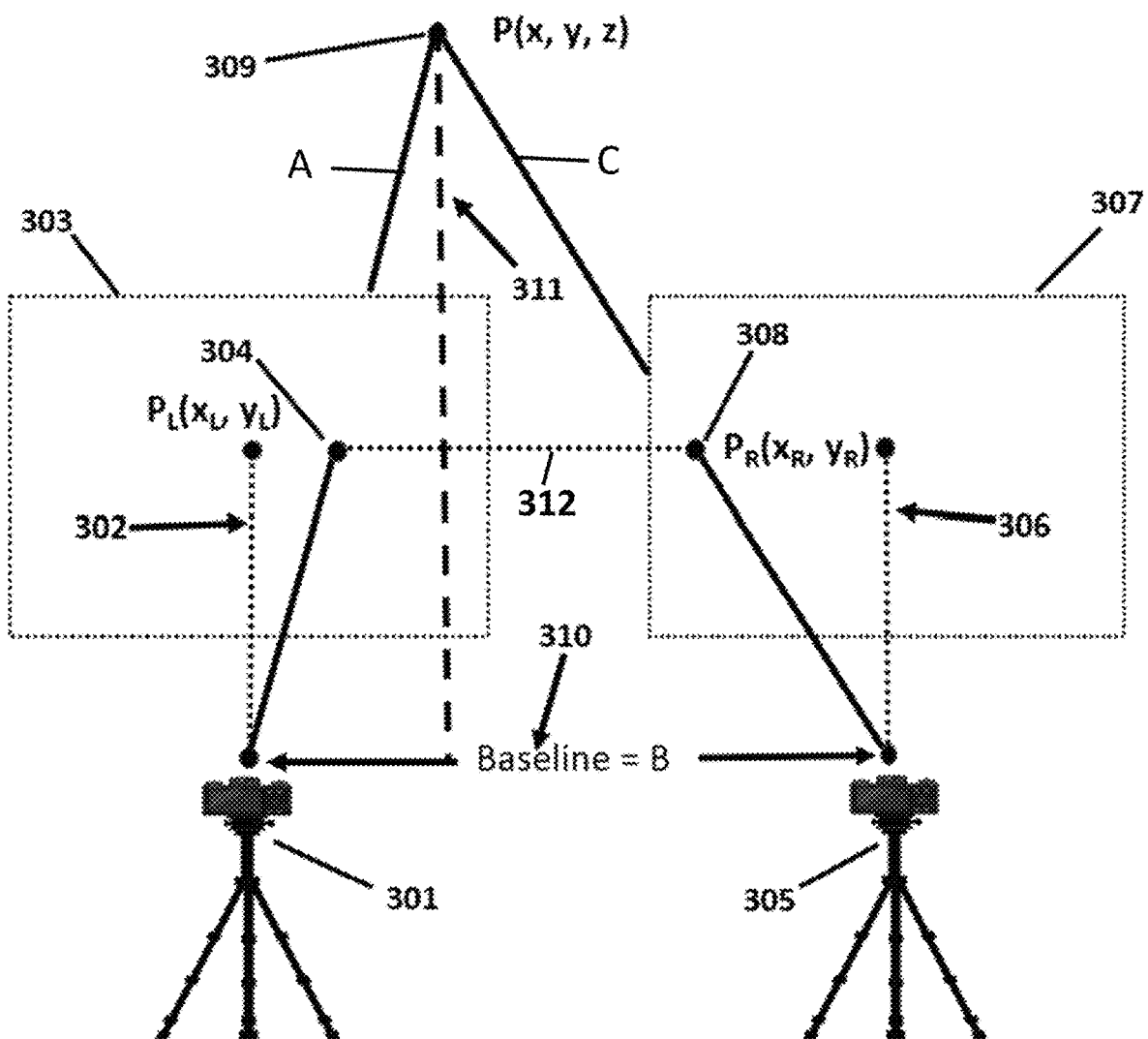
FIG. 3 shows the similar triangles that provide the geometric basis for how depth or z-axis position measurements are made using two cameras with parallel optical axes.

FIG. 3 diagrams the geometric basis for making the depth or z-axis position measurements in the case where the two cameras, labelled as left camera 301 and right camera 305, positioned at points L and R respectively, are mounted such that the optical axes of the cameras are parallel. Also, the focal length (f) of each camera along its respective axis is equal to the other and shown as the respective dotted lines, 302 and 306.

The left camera and right camera are aligned vertically, and if the camera-lens combinations were free of any distortion, then the point T which is also labelled 309, P(x,y,z), in three-dimensional space would intersect the left image plane, 303 at the position $P_L(x_L, y_L)$ labeled 304 and the right image plane, 307, at the position $P_R(x_R, y_R)$ labeled 308. In this situation, the $y_L$ and $y_R$ values are equal and the disparity between the values of $x_L$ and $x_R$, as represented by dotted line 312, provides the information necessary to cal- culate the depth (z-axis distance) of point P(x,y,z). Also, each line of sight for the two cameras, 301 and 305, is depicted as continuing on the far side of each respective plane, 303 and 307, and intersecting at point 309. The line of sight from the left camera 301 to this point 309 is referenced in FIG. 3 as "A" while the line of sight from the right camera 305 to the same point 309 is referenced in FIG. 3 as "C." The baseline "B" is the distance between points L and R where the left and right vertically-aligned cameras are located and labeled 310. The positions $P_L$ and $P_R$ where the line of sight between the cameras and the point T intersect the focal planes of the cameras are identified as points U and V and labelled as 304 and 308, respectively. The lines LR and UV are parallel and are corresponding sides of the similar triangles LRT and UVT, respectively. The depth or position on the z-axis at a given point (Z) can be represented as the dashed line labelled 311 and the distance between the cameras (B) labelled 310 is related by Eq.1. Eq. 1 can be rearranged to provide the value of Z as shown in Eq.2.

$$\frac{B}{Z} = \frac{B + x_R - x_L}{Z - f} \qquad \text{Eq. 1}$$

$$Z = \frac{f \times B}{x_R - x_L} \qquad \text{Eq. 2}$$

Figure 4:
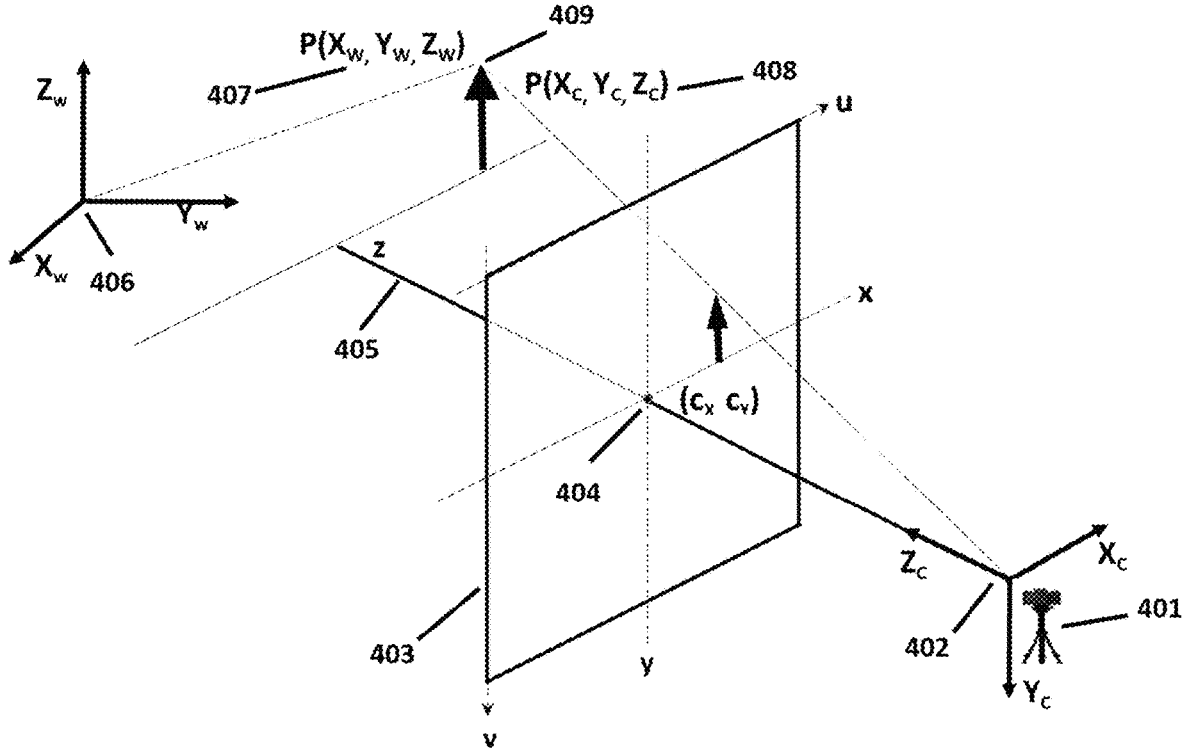
FIG. 4 illustrates the geometric relationship between a world coordinate system and the camera coordinate system that is related by a rotational and translational transformation.

In other aspects, it may be desirable to perform the depth or z-axis position measurements but relate it to an external coordinate system. In FIG. 4, the external world coordinate system is labelled 406 and has axes $X_W$, $Y_W$, and $Z_W$. The camera labelled 401 measures the coordinates of a spatial location in the coordinate system, 402, using axes $X_C$, $Y_C$, and $Z_C$. In this figure, the depth or position on the z-axis (Z) value, 405, for $Z_C$ with respect to the reference camera has already been determined and is drawn as the line passing through the optical center, 404, of the optical plane labelled 403. The mathematical transformation of the coordinates of the spatial location, 409, in camera coordinates $P(X_C, Y_C, Z_C)$ labelled 408 to the world system coordinates $P(X_W, Y_W, Z_W)$ labelled 407 is accomplished by matrix operations that translate and rotate the data values appropriately. The process of determining the rotation matrix and the translation vector to project coordinates between the camera and the world systems is accomplished by calibration routines available in OpenCV. Although previously citing the case where the camera-lens combinations were free of any distortion, this is only true in the ideal case. The OpenCV calibration process also determines the distortion coefficients related to focal length, optical center, and radial distortion intrinsic to the camera-lens system.

In an exemplary embodiment of this invention, the cameras are configured as described in FIGS. 1 and 3 with parallel optical axes. A photograph illustrating an arrangement of the cameras on a metal support plate is presented in FIG. 5. In an exemplary use, multiple cameras (in this case, a pair) are rigidly attached to the plate using precisely machined mounting holes and mating screws that prevent any relative motion between the cameras. Each camera is calibrated with each lens pair in the set provided with the cameras. The calibration process can take one of several options. An exemplary embodiment uses a checkerboard pattern such as illustrated in FIG. 6A. In a calibration lab where all the factors affecting the imaging process can be controlled, a preferred method to perform calibration is to capture several images of an object or pattern of known dimensions from different viewpoints. The checkerboard-based calibration method is one of several available in OpenCV. Another calibration routine utilizes a chart with circular patterns of known dimensions instead of the checkerboard pattern. Calibration can be accomplished in other embodiments using methods such as geometric clues in the scene like straight lines and vanishing points or deep learning based when there is very little control over the calibration setup.

In embodiments that require field calibration, a fixed pattern such as in FIG. 6A could be used in some cases. In some instances, such as outdoor measurements, calibration targets will be mounted on the structure at a minimum of 3 non collinear or 4 non-coplanar locations depending on the motion at the structural locations of interest. The accurate distance between the targets or accurate coordinate locations must be measured. The targets can be passive symbols such as a black shape, for example a circle, rectangle, or cross, on a white background. In other embodiments, LED lights producing a concentrate beam are attached to the object under test. In some cases, a single wavelength, for example near infrared LEDs are utilized; and a near infrared passband optical filter is coupled to the lens of the camera to enable calibration even in bright sunlight.

Figure 6A:
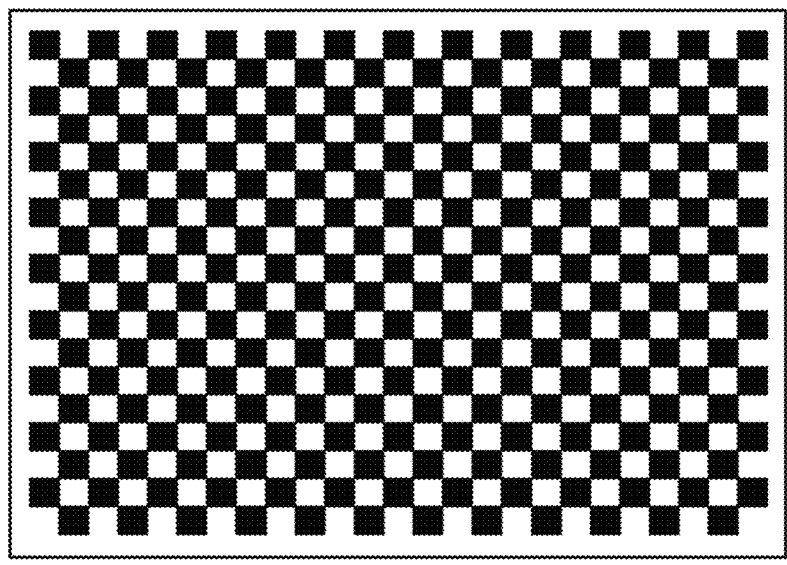
FIG. 6A is an illustration of the checkerboard pattern used to calibrate the camera and each pair of lenses provided with the system.
Figure 6B:
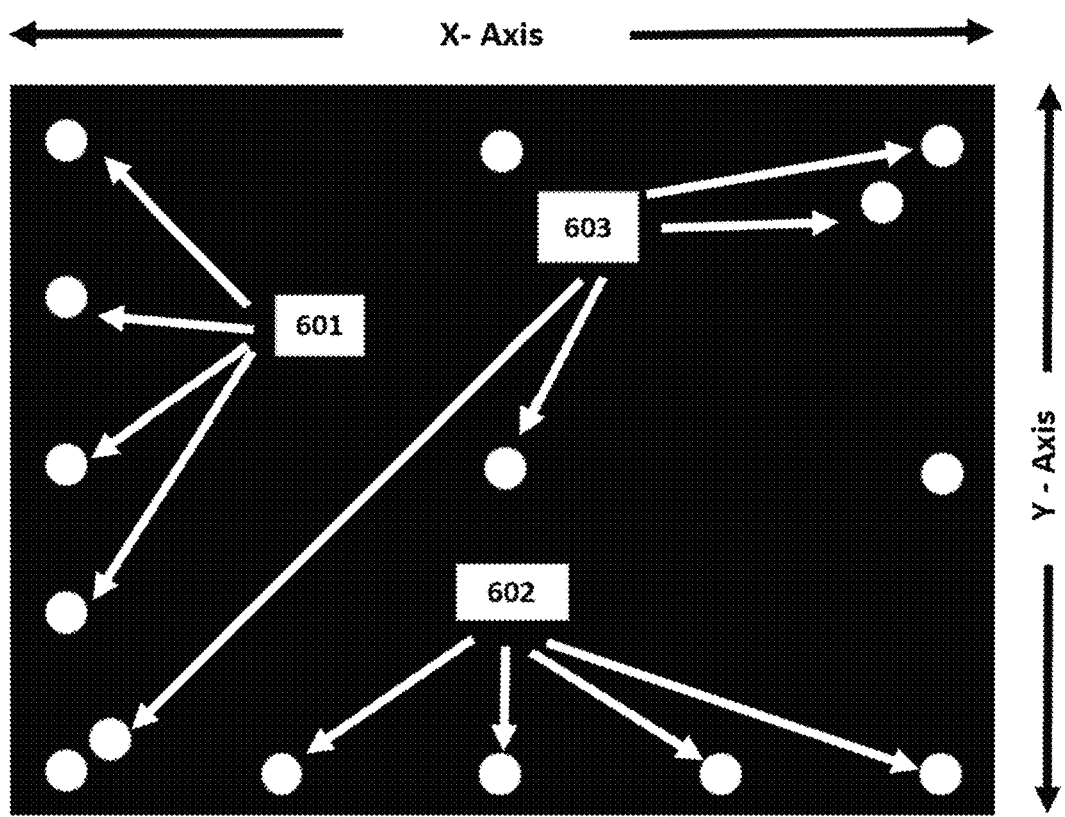
FIG. 6B is an illustration one embodiment of the layout of an intelligent calibration panel that utilizes wireless communication methods and a processor to control light emitting diode (LED) lights mounted on the panel to assist in a field calibration process of the video measurement system.

Another option for performing field calibration would be a grid of LED lights mounted on a rigid structure such as a panel or a frame and then attached securely to the object under test or to a stable nearby structure. The panel or frame could be constructed in a two-dimensional format or a three-dimensional format. A pair of two-dimensional units could obviously be combined to provide a three-dimensional geometry. An example of a two-dimensional panel is shown in FIG. 6B. In the simplest form, the calibration could be accomplished with a passive unit with dark symbols mounted on a white background similar to the calibration chart shown in FIG. 6A. However, a more intelligent, field-friendly embodiment would be battery powered, use wireless communication to an on-board processor that controls which LEDs are on or flashing at a specified frequency. The exact spacing between all LEDs would be known and optionally available as information that could be stored on the unit and retrieved optically from an affixed QR code or by wirelessly communicating with the unit.

In FIG. 6B, the LED lights evenly spaced along the Y-axis are labelled 601; LEDs evenly spaced along the X-axis are labelled 602; and those that are diagonally spaced are labelled 603. Other arrangements and spacing could be employed in alternate embodiments, including a panel that incorporates a z-axis offset between different sets of LEDs or a three-dimensional structure with LEDs mounted on all three axes. The spacing between LEDs selected to be switched on may be changed in different applications and enables the unit to be suitable for calibration where the distance between cameras and measured objects may vary significantly. Since the spacing between LEDs is known, the unit can be used to calculate the distance and angle between the camera and the panel as well as the calibration parameters to correct for camera\lens distortion and transform between the coordinate system established by the panel and that of the camera.

Figure 6C:
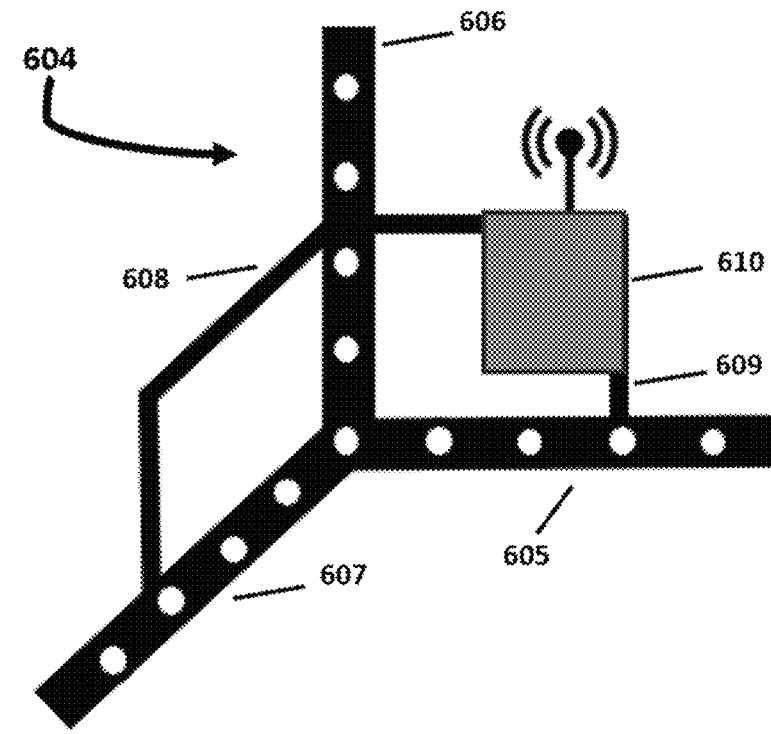
FIG. 6C illustrates one embodiment of a layout for an intelligent calibration unit which includes LEDs on a 3-axes structure with a rectangular mounting frame that supports a wireless intelligent controller and could be used to assist in field mounting or stabilization.
Figure 6D:
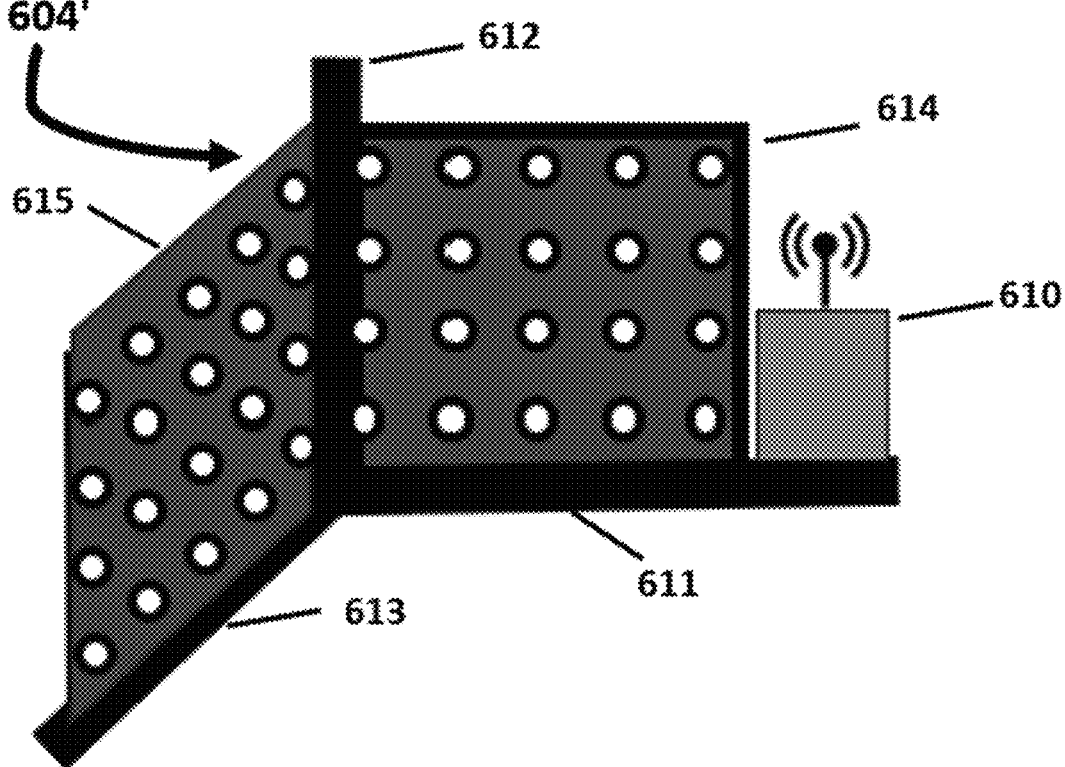
FIG. 6D illustrates an alternative embodiment for an intelligent calibration unit which includes two LED panels mounted on a 3-axes structure that supports a wireless intelligent controller and could be used to assist in field mounting or stabilization.

FIGS. 6C and 6D illustrate alternative embodiments, of many possible ones, for an intelligent field calibration unit (604, 604') suitable for use with systems and methods disclosed herein. FIG. 6C illustrates an exemplary layout for an intelligent calibration unit configured as LEDs on a 3-axes structure with a rectangular mounting frame that supports the wireless intelligent control module and could be used to assist in field mounting or stabilization. The structures configured along x, y, and z-axes are labelled as 605,

606, and 607, respectively. A rectangular support framework is identified as 608 and 609 and a control unit is labelled 610. In turn, FIG. 6D illustrates another exemplary layout for an intelligent calibration unit that is configured as LED panels identified as 614 and 615, respectively, mounted on a 3-axes support structure, with x, y, and z-axes labelled as 610, 611, and 612, respectively. Intelligent control module 613 is shown mounted to this support framework (in both FIG. 6C and FIG. 6D), but alternatively can be included as a detached unit with an interface cable to control operation of the individual LED lights. A calibration unit as described herein or in accordance with alternative embodiments easily discernible from these descriptions may be calibrated before being used in field. The lab calibration process for the calibration unit determines a precise distance between each of the LED lights mounted on the support framework.

Additionally, the flashing LEDs could be used to provide a calibration check for dynamic measurements. A frequency spectrum that measures the dynamic motion present on the mounted panel with selected LEDs on continuously can be examined to determine a frequency region where there is minimum, near-zero motion present. Then, the panel can be requested to flash a pair of LEDs along the diagonal or along both axes to create a square wave of apparent motion with a known amplitude along both axes. Video data collected with the light flashing should cause a peak to appear in the frequency spectrum at a known frequency and with a known amplitude. This should serve to verify the calibration parameters and provide a measure of accuracy for making dynamic measurements. If a three-dimensional structure or dual panels mounted with a z-axis offset is used, then the accuracy of the calibration along the z-axis of the structure can also be calculated or checked. Several mathematical methods well known to those skilled in the art are described in the literature for performing field calibrations using targets or LED lights on a two- or three-dimensional passive calibration unit mounted to the structure under test. The use of an intelligent calibration panel that can be controlled remotely by the video measurement system via wireless communications offers improved calibration capabilities not previously described in the art. An intelligent calibration panel such as that described above could also be used in single camera measurements where accuracy of the amplitude of the measured vibration motion is especially important to the study being performed.

In an exemplary embodiment, a field calibration for obtaining video measurements of motion is performed as follows. Except as indicated otherwise, for brevity this description refers to one camera, but it will be understood that the calibration process is performed on all cameras that will be involved in measuring the motion of an object.

1. A camera is positioned on a stable platform with the desired FoV, desired camera settings including the frame rate are established, and the lenses are adjusted to obtain adequate lighting, focus, and contrast.

2. The portable calibration unit is secured in a stable position in a FoV to establish the desired world coordinate system desired for the final readings.

3. A measurement system (i.e., system used in measuring vibratory motion along three spatial axes) which is connected to the camera communicates with the calibration unit to obtain the exact distances between all LED lights mounted on the calibration unit and to turn on a subset of the LEDs appropriate for the general calibration step.

4. Video is collected with enough frames to meet requirements of a calibration method employed from OpenCV or other methods known to those skilled in the art, and in particular to establish the distance from the camera to each LED on the calibration unit, while also establishing certain intrinsic parameters (defining the geometric and optical characteristics of the camera systems) and extrinsic parameters (defining the 3D position and orientation of the camera frame relative to a certain world coordinate system).

5. The measurement system will instruct the calibration to turn off all or a portion of the LEDs.

6. If a calibration verification step is desired, the measurement system will request all or a subset of the lights to be turned on and a second calibration check is performed to verify the adequacy of the measured calibration parameters.

7. A second set of video data is collected. A ROI is selected around at least one LED light on the calibration unit and the frequency spectrum is measured to identify frequencies already present in the background environment. A frequency range in the x- and y-axis vibration spectra that has no peaks and a low background level of motion is identified by the user or the computer program.

8. The measurement system connected to the one or more video cameras sends a command to the calibration unit to flash two or more selected LEDs at a specified frequency in the frequency range previously identified. The calibration unit will begin flashing units at the closest rate to the requested frequency achievable and return the actual flash rate to the measurement system. Selected pairs of LEDs alternate their respective flashing such that when one of the pair is on the other is off to simulate motion of an object between two points.

9. The measurement system collects a third set of video data while the flashing is occurring, and an ROI is selected that contains at least one set of the selected paired LED lights. The previous calibration parameters are used to rectify images from a pair of cameras and convert these to 3D world coordinates, and software executed by the measurement system determines the distance between the paired LEDs and the flashing frequency which can be compared with exact distance values provided from the calibration unit.

10. If the measured values do not show sufficient agreement to the values obtained from the calibration unit, then investigate the stability of cameras and calibration unit or factors associated with the measurement environment, and repeat the initial calibration process.

11. If no better results can be expected from correcting discovered issues or repeating the process, then document the achievable accuracy determined from the calibration check process.

Figure 5:
FIG. 5 is a photograph of two IRIS MR cameras that are mounted spatially and mechanically aligned such that their optical axes are parallel.
Figure 7A:
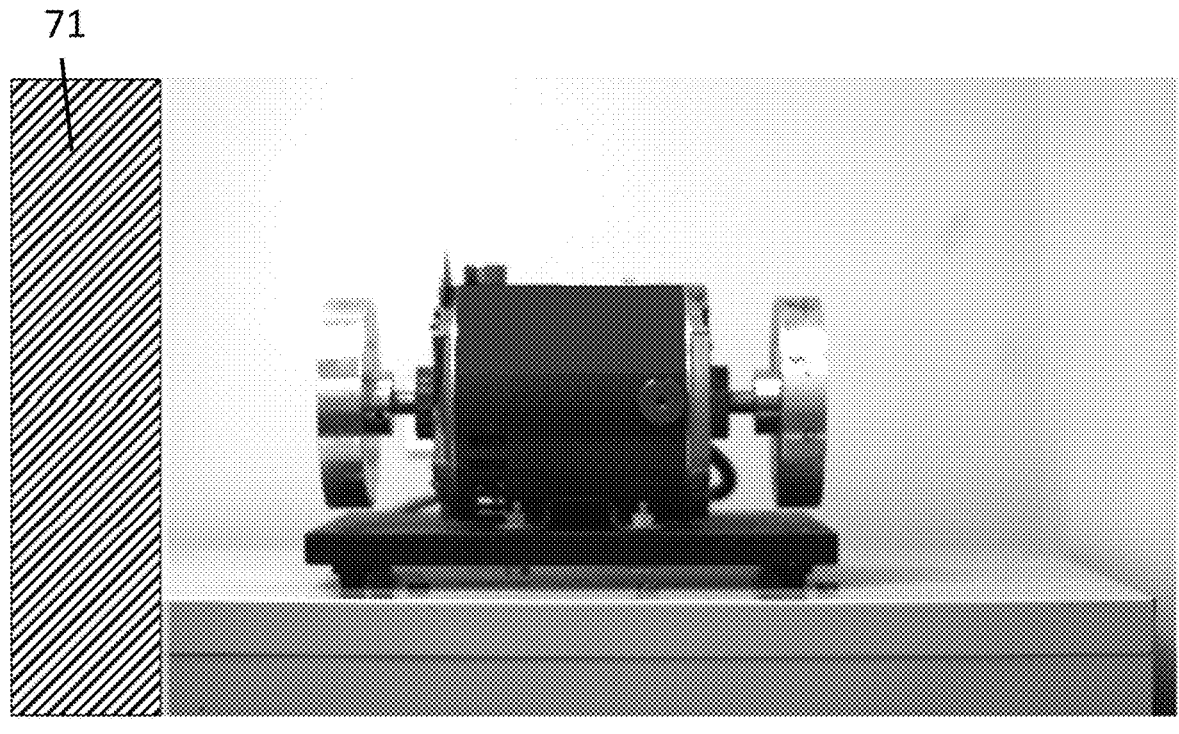
FIG. 7A is the image captured in the left camera with the cross-hatched section covering the spatial area that cannot be seen by the right camera.
Figure 7B:
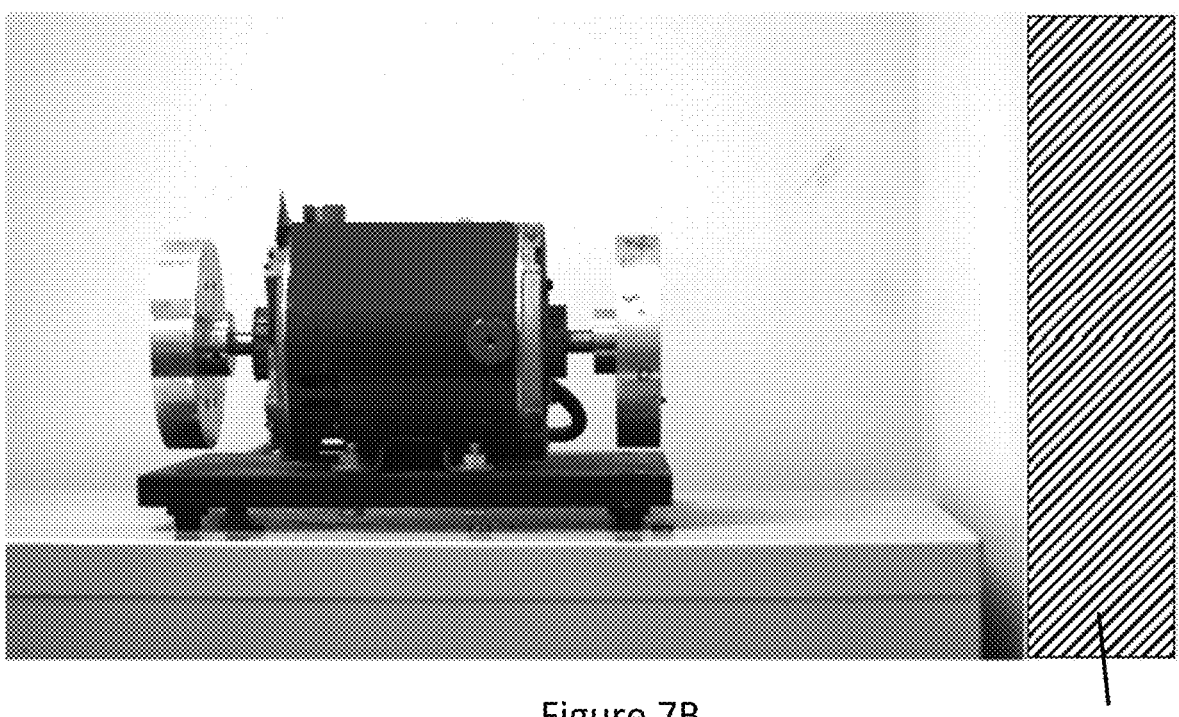
FIG. 7B is the image captured in the right camera with the cross-hatched section covering the spatial area that cannot be seen by the left camera.
Figure 7C:
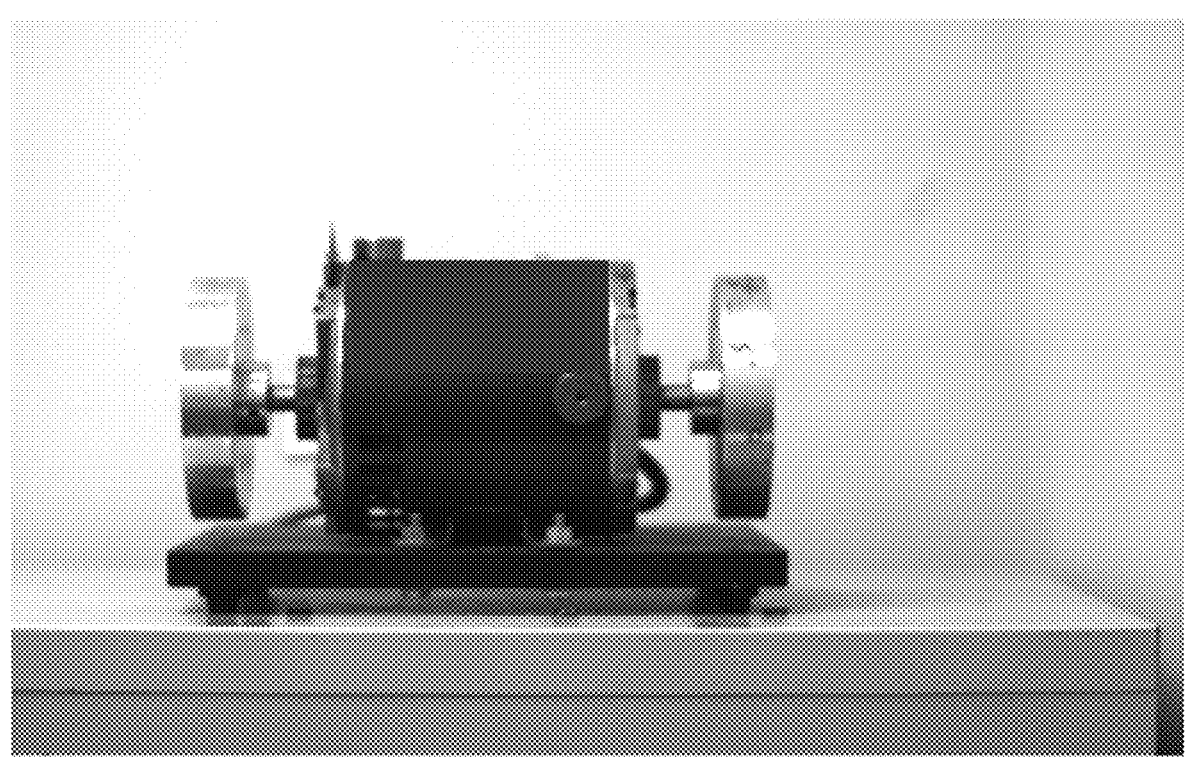
FIG. 7C is the image of the spatial area which can be seen by both cameras and is the portion available for identifying motion of identified objects or features.

One embodiment of a data acquisition process uses the camera setup shown in FIG. 5 with a calibrated pair of lenses on each camera. Since the cameras are offset in the horizontal direction, i.e., each an equal distance from the supporting surface with parallel optical axes, the FoV of each camera is slightly different as illustrated in FIG. 7A-C. The focal length and aperture for each camera is adjusted separately to obtain a well-lit, focused image. FIG. 7A is the image obtained from the left camera and has the portion of the scene, labeled as 71, which is not visible to the right camera represented by a cross-hatched rectangle. Similarly, FIG. 7B is the image viewed on the right camera with a cross-hatched rectangle representing the portion of the scene, labeled as 72, which is not visible to the left camera. FIG. 7C presents the scene jointly available to both cameras and defines the spatial areas available for making a z-axis measurement.

Figure 8:
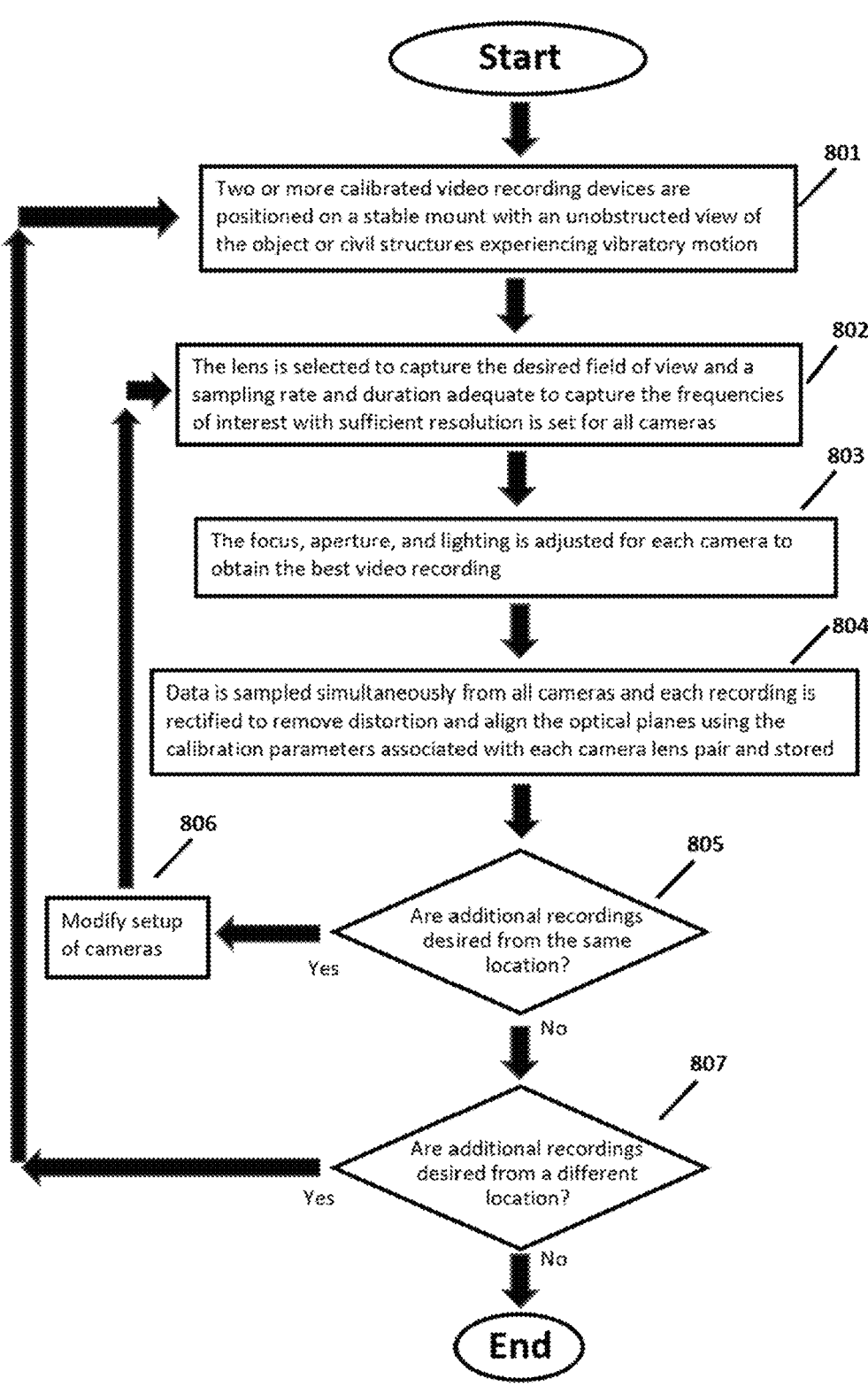
FIG. 8 is a flowchart of the data acquisition process when making measurements in 3 dimensions with two or more cameras.

A flowchart describing an exemplary data acquisition process is provided in FIG. 8. Two or more cameras are positioned on a stable mounting location with an unobstructed view of the object or structure experiencing vibratory motion as described in step 801. The user selects a lens of appropriate focal length to capture the desired FoV, affixes the corresponding calibrated lens to each camera, and sets the parameters that determine the sampling rate and the duration for the recordings to be collected in step 802. The focus, aperture, and lighting are adjusted for each camera to obtain the best video recording in step 803. A cable is connected between Sync Port on the reference camera and the other camera(s) to synchronize all cameras such that each frame is captured at the same instant in time. As described in step 804, when data acquisition is initiated, frames are collected simultaneously on all cameras and each recording is checked to ensure that no frames have been lost due to timing conflicts in the system. When all of the frames are acquired, the system software executes routines which rectify the data using the calibration coefficients and provides video frames which are spatially internally consistent between all cameras and stored for later analysis. If additional data is desired from this same recording location, 805, then the acquisition setup parameters will be modified at step 806, and the operation returns to step 802. If additional recordings are desired from a different recording location, 807, then the process returns to step 801. Otherwise data acquisition ends and the user can begin the data analysis process. In terms of the acquisition of data in these embodiments, a target or other fiducial mark may be fixed on one or more places on the object under study, to make displacement measurements easier and to provide a reference point for current and future measurements.

Figure 9:
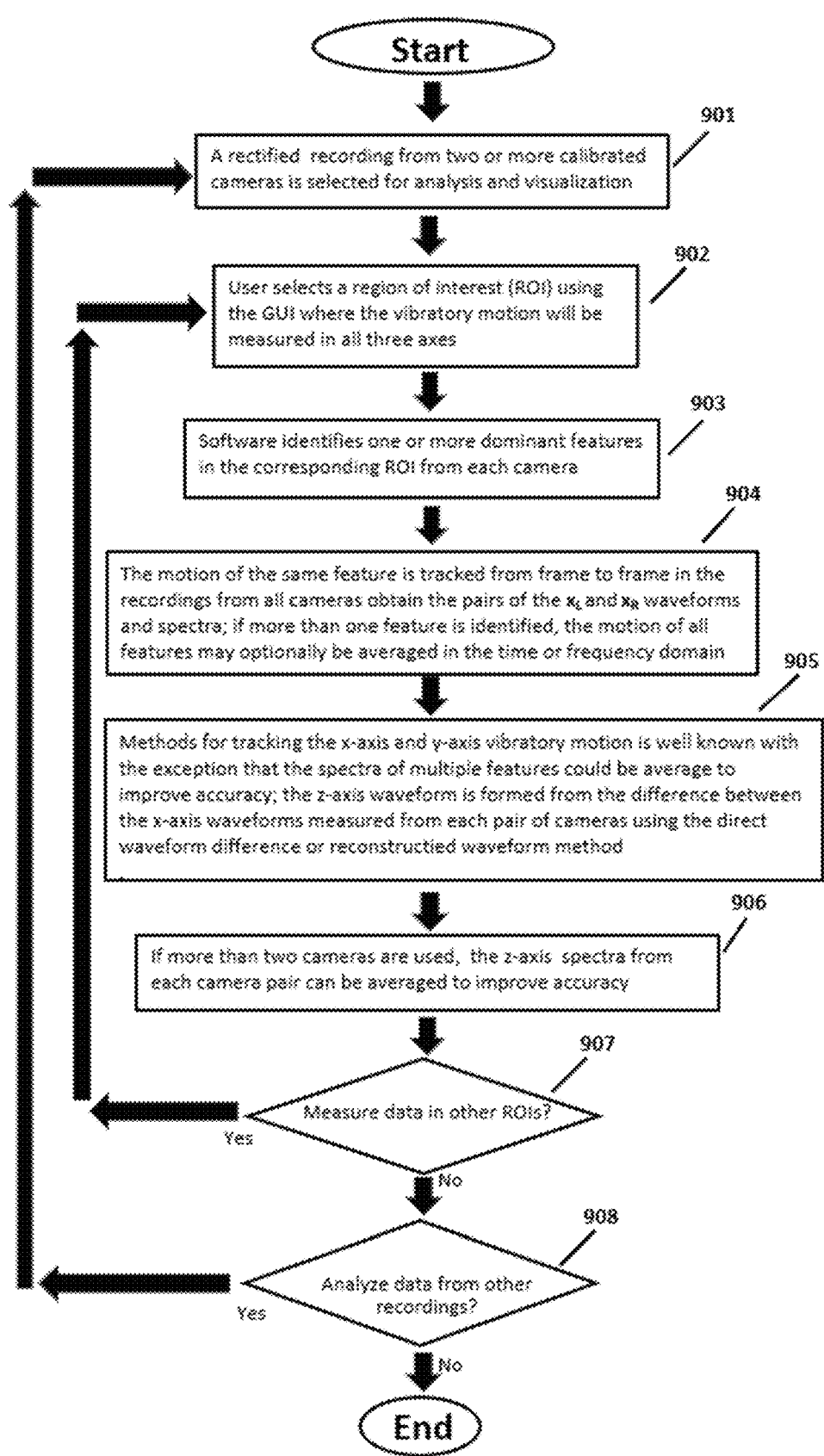
FIG. 9 is a flowchart of an exemplary data analysis process for calculating the vibratory motion along the optical axis based on the difference in the spectrum of the x-axis motion from two or more cameras.

A flowchart for an exemplary analysis process is provided in FIG. 9 that begins with the rectified recordings from two or more cameras in step 901. The description of this process assumes that two cameras are used. During the analysis process, the user will select a spatial region of interest (ROI) in the concurrent field of view (CFoV) from the reference camera where the vibratory motion will be measured in step 902. This selected ROI must contain one or more distinctive features whose motion can be tracked (903). Several methods for tracking the motion of features in a video are well known to those skilled in the art such as but not necessarily limited to optical flow, correlation, block-matching, and artificial intelligence (AI) methods as described in step 904. Various embodiments provided herein include those wherein the computer program further operates to identify at least one feature on the object as a site for evaluating the vibratory motion of the object.

In some embodiments, motion of each feature is tracked from frame to frame to identify the x-axis and y-axis motion in the rectified focal plane. If more than one feature is tracked, then the motion from all of the features is averaged to construct the x-axis waveform from each camera pair.

These two waveforms—one from each camera in this exemplary process—are used to determine the z-axis motion using the waveform difference or spectral reconstruction method. Regarding the latter alternative, an example of systems and methods that employ spectral reconstruction is found in U.S. Pat. No. 11,322,182, titled "Enhanced visualization techniques using reconstructed time waveforms" and issued on May 3, 2022, the contents of which are fully incorporated by reference herein. If more than two cameras are used in an embodiment, then the z-axis waveform and spectrum from each camera pair is averaged to reduce noise in the measurement of the final result as step 906 describes. By reducing noise, this spectral reconstruction can be more suitable for measuring motion where the movements are in the range of 10 mils or less, compared to conventional approaches that use only differences in waveforms, due to the high amount of noise produced by such conventional approaches. Continuing with the steps shown in FIG. 9, if the z-axis motion in other ROIs is desired (907), then the user returns to step 902. If not, and other recordings are available (908), then the user can elect to return to step 901 and analyze the additional recordings.

The values of $x_L$ and $x_R$ in the denominator of Eq. 2 represent the vibratory motion measured in the x-axis measured by the left and right cameras, respectively. These values are typically small, less than 10 mils and would be very close in value when measured by cameras that are close spatially. The measured result $x_L - x_R$ is very small, often a fraction of a mil and extremely sensitive to any noise present in the measurement. When minimal noise is present, the z-axis motion can be calculated directly from the difference in the $x_L$ and $x_R$ waveforms yielding a z-axis waveform directly. It has been observed that this method produces a z-axis waveform with a noise component at least 10 times that in the original $x_L$ and $x_R$ waveforms.

Figure 10:
FIG. 10 shows the ROI on a drill press where an optical measurement was made in accordance with present embodiments.
Figure 11A:
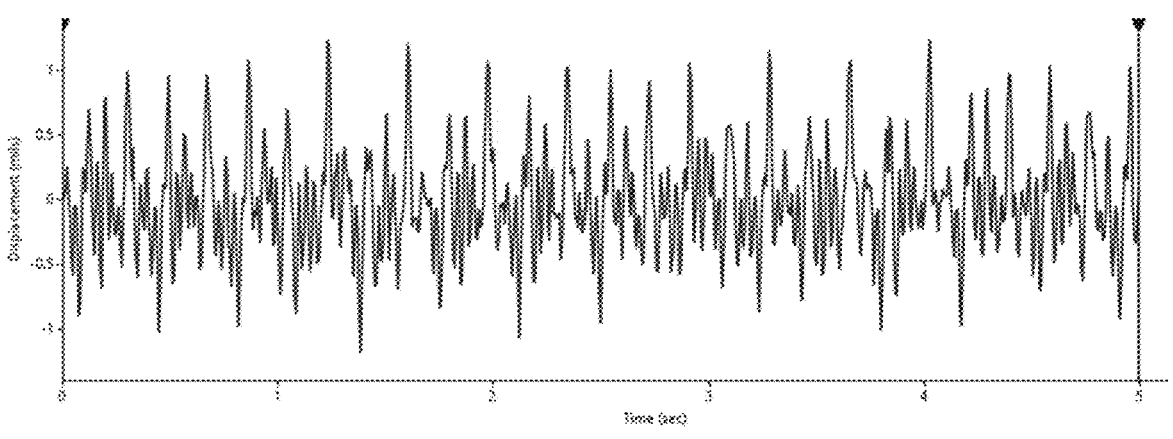
FIG. 11A is the waveform of the x-axis vibratory motion in the ROI from the left camera.
Figure 11B:
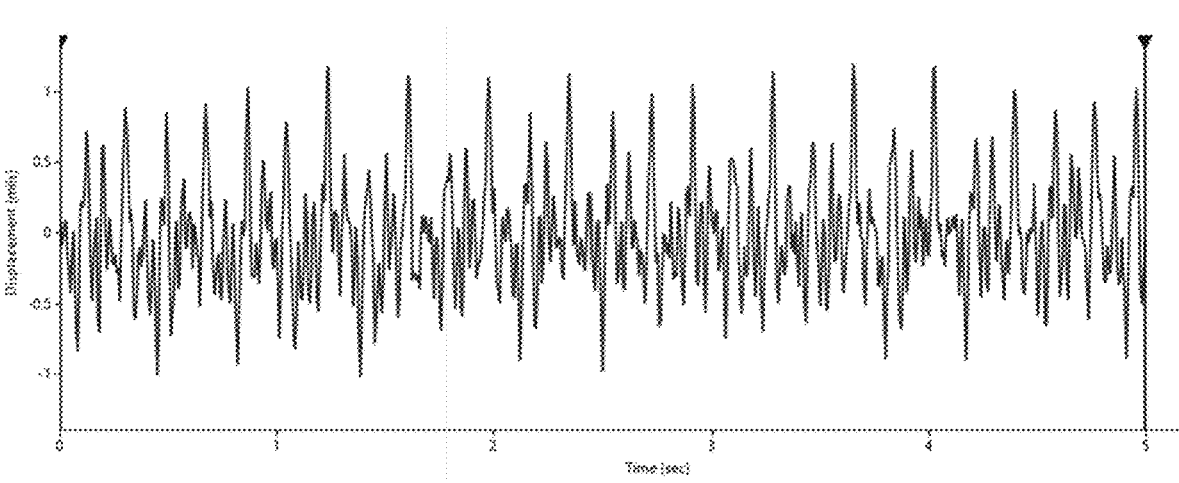
FIG. 11B is the waveform of the x-axis vibratory motion in the ROI from the right camera.
Figure 11C:
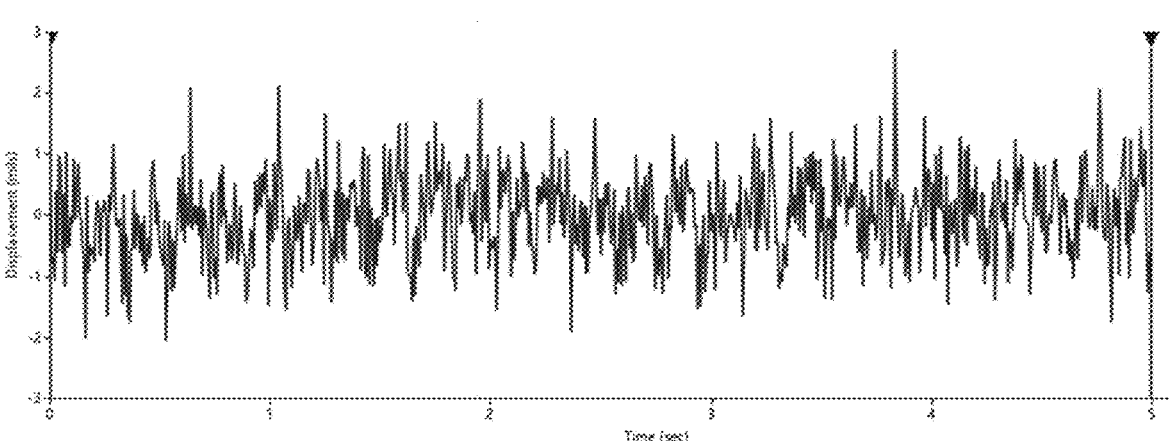
FIG. 11C is the constructed waveform of vibratory motion along a z-axis (sometimes referred to herein as a third axis) in the ROI from difference between left and right waveforms.
Figure 11D:
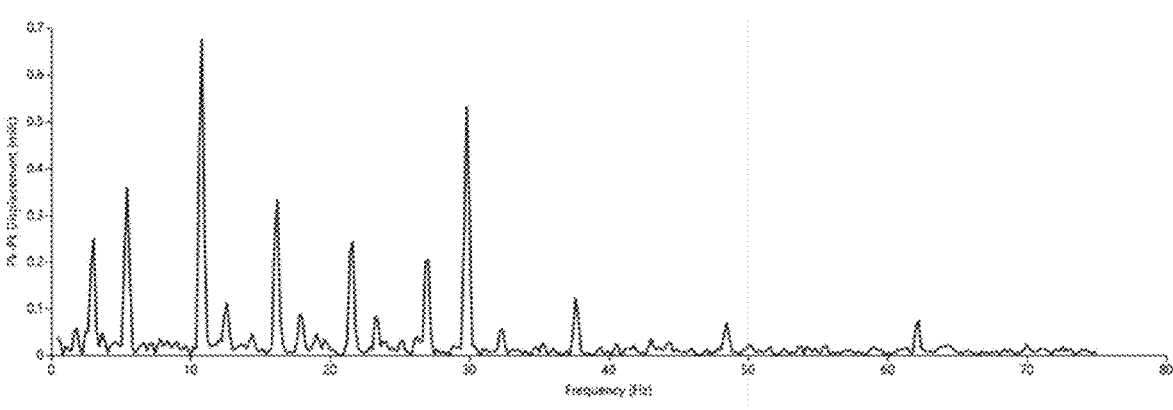
FIG. 11D provides a frequency spectrum of the x-axis vibratory motion in the ROI from the left camera.
Figure 11E:
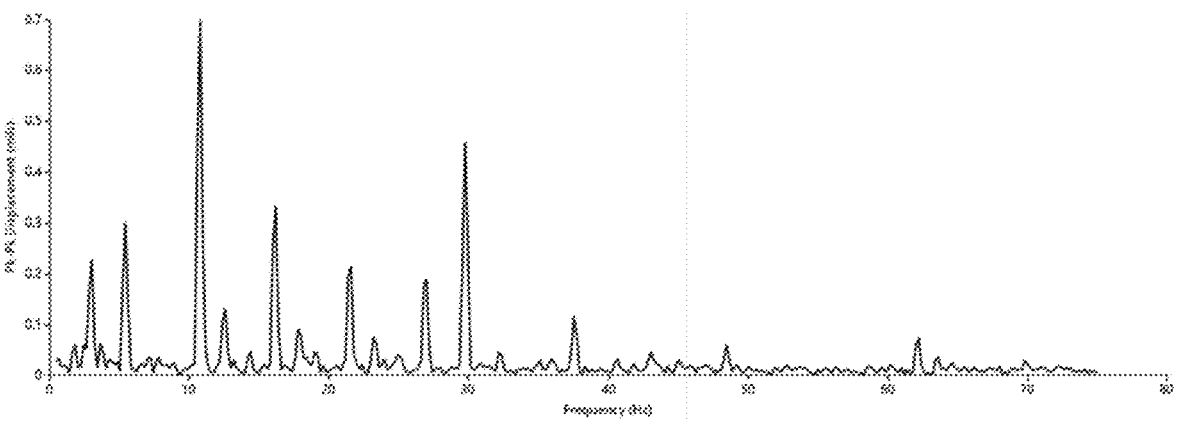
FIG. 11E provides a frequency spectrum of the x-axis vibratory motion in the ROI from the right camera.
Figure 11F:
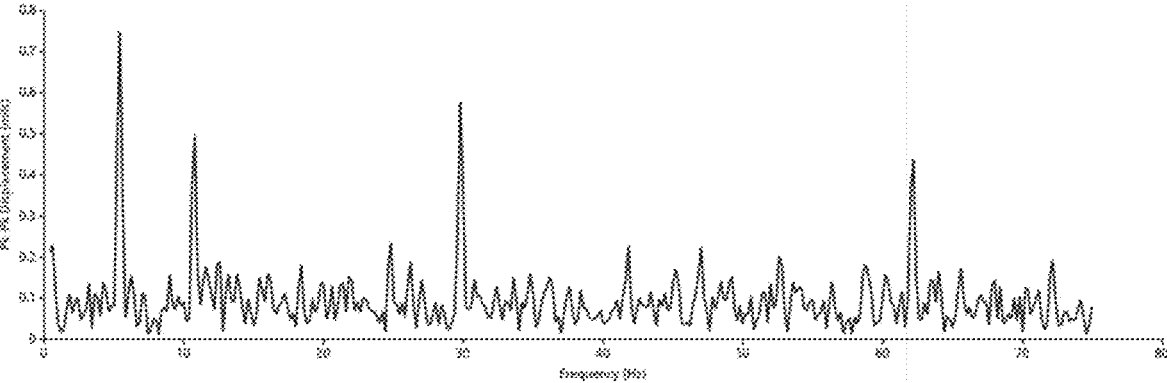
FIG. 11F is the frequency spectrum of the constructed waveform of the z-axis vibratory motion in the ROI from difference between left and right waveforms.

In an exemplary use, data was collected from the drill press shown in FIG. 10, and an optical measurement of the motion within the ROI outlined by a white rectangle labelled 1001 was extracted. The writing on the label pictured in FIG. 10 is not material to the subject matter herein. FIG. 11A presents the graph of x-axis vibratory motion waveform in the user-selected ROI from left camera, and FIG. 11B presents the graph of x-axis vibratory motion waveform in the ROI from right camera. FIG. 11C presents the z-axis vibratory motion waveform in the ROI calculated from the difference between left and right waveforms. The frequency spectra (or, as sometimes shortened to herein, "spectra") of the waveforms of the x-axis vibratory motion in the ROI from the left and right cameras are shown in FIGS. 11D and 11E, respectively. FIG. 11F shows a frequency spectrum based on the constructed waveform from the z-axis vibratory motion waveform in the ROI as shown in FIG. 11C, calculated from the difference between the left waveform and the right waveform as shown in FIGS. 11A-11B. It is clear that the noise floor of the z-axis spectrum is much higher than that in the spectra from the left and right camera. In some cases using this method, the noise present in the z-axis waveform significantly masks the true motion present.

An alternate method for calculating the z-axis vibratory motion removes much of the noise problem. This approach takes advantage of the averaging inherent to the FFT algorithm and the selection of the dominant peaks in the resulting frequency spectrum to remove noise. The amplitude of the peaks in the FFT spectrum represent average RMS values determined from all of the individual time waveform values. If the spectra of the original $x_L$ and $x_R$ waveforms are calculated, then the amplitude of the peaks in the spectra are averaged values. If the sine waves represented by peaks in the frequency spectra are summed to construct new $x_L$ and $x_R$ waveforms, most of the random noise present in the original waveforms is removed. The subtraction of these waveforms will result in a z-axis waveform with greatly reduced noise and a corresponding spectrum with increased measurement accuracy over a direct subtraction of the original waveforms. If the true peaks in the original $x_L$ and $x_R$ spectra are located, then the waveform and spectrum for the z-axis vibratory motion can be calculated using the following steps:

1. The most precise values of the amplitude, frequency, and phase for each peak should be located using the spectral windows factors method, the Goertzel algorithm, or other fitting techniques known to those skilled in the art 2. Discard peaks that do not have a close match in frequency in the $x_L$ and $x_R$ spectra a. Match for same peaks in upper 20 db of spectra with better than 0.15\*resolution b. Match for same peaks below upper 20 db of spectra with better than 0.20\*resolution c. Ignore peaks that match lighting flicker frequency (usually 120 Hz or 100 Hz)

3. Discard low amplitude peaks whose amplitude is less than a factor of F times the noise floor; preferably using an average noise floor around each specific peak 4. Construct the waveform and spectrum of the z-axis motion from the remaining sets of selected peaks using one of several equivalent approaches:

a. Reconstruct $x_L$ and $x_R$ waveforms by summing the sine waves from the reduced set of selected peaks; and take the difference between the $x_L$ and $x_R$ waveforms to construct the z-axis waveform and use the FFT algorithm to obtain the z-axis spectrum b. Construct the z-axis waveform, $Z(t)$, using the difference in sine waves from the reduced set of selected peaks, z p, defined by their amplitude, frequency, and phase values using the formulas below and then apply the FFT algorithm to get the frequency spectrum:

$$Z(t) = \Sigma zp(t)$$

$$zp(t) = C * \sin(2\pi F t + P3)$$

$$X1 = A * \cos(P1) \text{ and } Y1 = A * \sin(P1)$$

$$X2 = B * \cos(P2) \text{ and } Y2 = B * \sin(P2)$$

$$C = \text{Sqrt}(X12 - 2*X1*X2 + X22) + Y12 + 2*Y1*Y2 + Y22)$$

$$P3 = \text{Arctan}[(X1 - X2)/(Y1 - Y2)]$$

Figure 12A:
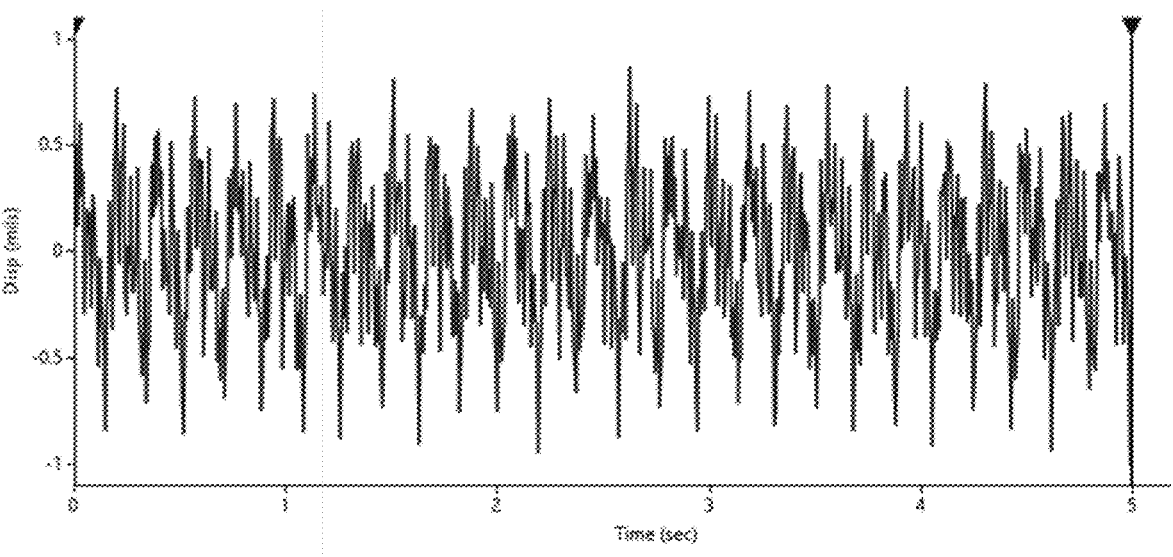
FIG. 12A is a constructed waveform of the z-axis vibratory motion in the ROI from differences between spectra obtained from the left and right cameras, respectively.
Figure 12B:
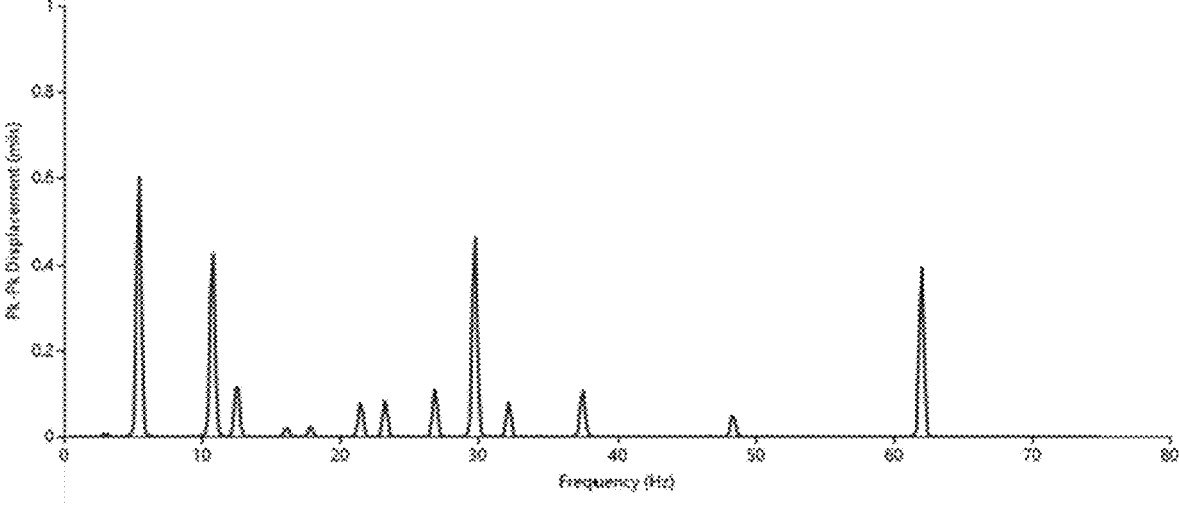
FIG. 12B is a constructed spectrum of the z-axis vibratory motion in the ROI from differences between spectra obtained from the left and right cameras, respectively.

If we set P1 to zero, then X1=A and Y1=0 yielding $$C = \text{Sqrt}(A2 - 2*A*X2 + X22 + Y22)$$

$$P3 = P1 + \text{Arctan}[(A - X2)/Y2^2]$$

c. The z-axis spectrum could be formed first using the values determined from the equations above and the waveform calculated using the inverse FFT algorithm It may be useful to add noise approximately equal to that present in the original data to give both the spectrum and the waveform a more typical appearance, but this is optional. FIGS. 12A-B illustrate the use of this second method to calculate the z-axis motion FIG. 12A is the waveform of the z-axis motion constructed from the paired peaks in the left and right spectra. FIG. 12B is the spectrum of the z-axis motion constructed from the waveform shown in FIG. 12A, i.e., from the paired peaks in the left and right spectra. This method significantly reduces the noise contamination of the z-axis measurement. The averaging of the data that is inherent to the FFT calculation allows peak amplitude values to be more accurate. This increases the measurement accuracy of the z-axis motion determination especially when dealing with small motions or when locating low amplitude signal components to be identified above the measurement noise. The spectra in FIGS. 11F and 12B are derived from the same data but using the different methods described herein. It will be seen that FIG. 12B more clearly identifies the lower amplitude peaks in the spectra and shows different, more accurate, amplitudes for even larger peaks in the spectrum.

The method of using the significant peaks in the spectra from the left and right camera to calculate z-axis motion can also be impacted negatively if the noise in the data is large enough to compromise the identification of peaks. This can be helped by taking a longer recording. The longer recording can be processed as a single block to reduce noise and improve frequency resolution or broken into sequential, overlapping blocks of data and averaged to reduce the noise. Alternatively, sequential, independent recordings (i.e., independent in time from the same location) could be acquired and averaged. The averaged spectra can be used to obtain better identification of the amplitude and frequency values of real signal components, but the phase must be established from data that has not been averaged.

Another alternate embodiment could utilize the auto- and cross-power spectral measurements between the left and right camera data to determine the relative magnitude between frequencies components of the x-axis signals (L and R). The averaged transfer function, TF, between the two signals would be calculated as shown in Eq. 3 below:

$$TF = \text{Cross Power Spectrum}(L,R)/\text{Power spectrum}(L)$$
$$= SLR(f)/SLL(f) \qquad \text{Eq.3}$$

The averaged cross-power spectrum, SLR(f), by summing it in the complex form and then dividing it by the number of averages, before converting it to magnitude and phase. The power spectrum, SLL(f), is already in real number and is averaged normally. The coherence function, CF, is often used in conjunction with the transfer function as an indication of the quality of the transfer function measurement and indicates how much of the response energy (right camera signal) is correlated to the stimulus energy (left camera signal). The coherence could be used to assist in identifying the peak energies to be used in the z-axis calculation. In this scenario, the amplitude, frequency, and phase differences could be determined from averaged auto, cross power spectra, and transfer function. If more than two cameras are used to make the measurement, then the results from each pair of cameras can be averaged in accordance with the teachings provided herein to improve the accuracy of the z-axis vibratory motion measurement.

It will be understood that the embodiments described herein are not limited in their application to the details of the teachings and descriptions set forth, or as illustrated in the accompanying figures. Rather, the present embodiments and alternatives, as described and claimed herein, are capable of being practiced or carried out in various ways. Also, it is to be understood that words and phrases used herein are for the purpose of description and should not be regarded as limiting. The use herein of such words and phrases as "including," "such as," "comprising," "e.g.," "containing," or "having" and variations of those words is meant to encompass the items listed thereafter, and equivalents of those, as well as additional items.

Accordingly, the foregoing descriptions of several embodiments and alternatives are meant to illustrate, rather than to serve as limits on the scope of what has been disclosed herein. The descriptions herein are not intended to be exhaustive, nor are they meant to limit the understanding of the embodiments to the precise forms disclosed. In terms of the descriptions, it will be understood by those having ordinary skill in the art that modifications and variations of these embodiments are reasonably possible in light of the above teachings and descriptions.

What is claimed is:

1. A system for measuring vibratory motion along three spatial axes of an object undergoing movement, from video recordings comprising a plurality of video images of the object as it undergoes movement, the video images being divisible into individual video image frames with each individual video image frame being divisible into a plurality of pixels, said system comprising:

two or more video acquisition devices operably connected to a processor, that have a fixed spatial relationship and matching lens that are calibrated to determine a depth or series of position measurements in a direction parallel to the optical axis of one of the video acquisition devices serving as a reference camera to a point on the object undergoing motion;

a computer program operating in said processor to:

adjust a frame rate of the two or more video acquisition devices to provide for a sampling rate to capture a plurality of frequencies present in the vibratory motion and acquire the individual frames on all video acquisition devices simultaneously;

calculate a displacement of the object along two axes of the vibratory motion representing the focal plane of each camera pair, wherein the two axes are a first axis referred to as an x-axis and a second axis referred to as a y-axis, respectively; and determine the vibratory motion in a third axis, referred to as a z-axis, wherein the third axis is parallel to the optical axis of the reference camera.

2. The system of claim 1, wherein when the video acquisition devices are horizontally-aligned, the vibratory motion is derived based on differences in the first axis motion waveform constructed from the video images from the two or more video acquisition devices, and when the two or more video acquisition devices are vertically-aligned, the vibratory motion is derived based on differences in the second axis motion waveform constructed from the video images from the two or more video acquisition devices.

3. The system of claim 1, wherein when the two or more video acquisition devices are horizontally-aligned or vertically-aligned, the vibratory motion is derived based on differences between matching frequency peaks in the first axis motion frequency spectra constructed from sampled data from the two or more video acquisition devices, and when the two or more video acquisition devices are vertically-aligned, the vibratory motion is derived based on differences between matching frequency peaks in the second axis motion frequency spectra constructed from sampled data from the two or more video acquisition devices.

4. The system of claim 3, wherein the computer program operates to increase a measurement accuracy of the third axis vibratory motion by constructing averaged spectra from at least one of sequential overlapped averaging on a longer data set or by averaging data sets from multiple, independent sequential recordings.

5. The system of claim 1, wherein the computer program further operates to calculate additional measurements of the third axis vibratory motion from at least one additional pair of calibrated video acquisition devices to increase a measurement accuracy of the third axis vibratory motion.

6. The system of claim 1, wherein the computer program further operates to identify at least one feature on the object as a site for evaluating the vibratory motion of the object.

7. The system of claim 1, wherein the computer program further operates to identify at least one of a fiducial mark or a target mounted in or on the object.

8. The system of claim 1, wherein the computer program further operates to track multiple features in a selected ROI to increase a measurement accuracy of the third axis vibratory motion.

* * * * *